US012773746B2

(12) United States Patent
Bergami et al.

(10) Patent No.: US 12,773,746 B2
(45) Date of Patent: Oct. 27, 2026

(54) WELDING APPARATUS

(71) Applicant: TECNA S.P.A., Castel San Pietro Terme (IT)

(72) Inventors: Damiano Bergami, Castel Guelfo di Bologna (IT); Dante Belluzzi, Bologna (IT)

(73) Assignee: TECNA S.P.A., Castel San Pietro Terme (IT)

( * ) Notice: Subject to any disclaimer, the term of this patent is extended or adjusted under 35 U.S.C. 154(b) by 803 days.

(21) Appl. No.: 18/018,347

(22) PCT Filed: Jul. 23, 2021

(86) PCT No.: PCT/EP2021/070681

§ 371 (c)(1),
(2) Date: Jan. 27, 2023

(87) PCT Pub. No.: WO2022/023207

PCT Pub. Date: Feb. 3, 2022

(65) Prior Publication Data

US 2023/0271269 A1 Aug. 31, 2023

(30) Foreign Application Priority Data

Jul. 28, 2020 (IT) ........................ 102020000018202

(51) Int. Cl.
*B23K 11/25* (2006.01)
*B23K 11/31* (2006.01)

(52) U.S. Cl.
CPC ............ *B23K 11/255* (2013.01); *B23K 11/31* (2013.01)

(58) Field of Classification Search
CPC .... B23K 11/255; B23K 11/31; B23K 26/703; B23K 26/082; B23K 26/32; B23K 26/24;
(Continued)

(56) References Cited

U.S. PATENT DOCUMENTS 7,145,097 B2 * 12/2006 Leach .................. B23K 11/315 219/110
2002/0130111 A1 * 9/2002 Menin .................... B23K 26/32 219/161
2014/0338448 A1 * 11/2014 Ashino ............... B32B 38/0008 73/488

FOREIGN PATENT DOCUMENTS

CN 103228389 A 7/2013
DE 102010042085 A1 4/2012
JP H0593674 U 12/1993

OTHER PUBLICATIONS

Chinese Office Action for Application No. 202180032840.4, dated Aug. 11, 2025, 6 pages, English translation.
(Continued)

*Primary Examiner* — Phuong T Nguyen
(74) *Attorney, Agent, or Firm* — CANTOR COLBURN LLP

(57) ABSTRACT

A welding apparatus includes a movement assembly for at least one electrode configured to be passed through by current for the execution of welding treatments. The assembly includes at least one cylinder and at least one stem which rigidly supports the electrode; the stem is at least partially accommodated in the cylinder and is coaxially movable with an alternating straight motion along the longitudinal axis of the cylinder, in order to press the electrode against the parts to be welded with a corresponding welding force.
A device for measuring the welding force is also provided, which has a plate stably interposed between the stem and the electrode with the respective faces arranged at right angles to the longitudinal axis, and plurality of deformation sensors accommodated in through slots provided in the plate and distributed along an imaginary circumference which is centered along the longitudinal axis.

10 Claims, 12 Drawing Sheets

(58) Field of Classification Search
CPC .... B23K 26/28; B23K 26/22; B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20; B23K 26/0066
USPC ........... 219/86.9, 86.41, 86.51, 78.1, 121.63, 219/121.64, 136, 119, 110
See application file for complete search history.

(56) References Cited

OTHER PUBLICATIONS

International Search Report for International Application No. PCT/EP2021/070681, International Filing Date Jul. 23, 2021, Date of Mailing Nov. 3, 2021, 4 pages.
Italian Search Report for Italiana Application No. 102020000018202 dated Apr. 16, 2021, 7 pages.
Written Opinion for International Application No. PCT/EP2021/070681, International Filing Date Jul. 23, 2021, Date of Mailing Nov. 3, 2021, 5 pages.
Indian Office Action for Application No. 202237060553, dated Jun. 5, 2026, 7 pages.

* cited by examiner

WELDING APPARATUS

CROSS-REFERENCE TO RELATED APPLICATIONS

The present application is a 35 U.S.C. § 371 National Stage patent application of International patent application PCT/EP2021/070681, filed on 23 Jul. 2021, which claims priority to Italian patent application 102020000018202, filed on 28 Jul. 2020.

TECHNICAL FIELD

The present disclosure relates to a welding apparatus.

BACKGROUND

As is known, the term “electric resistance welding” identifies a vast category of methods, in which the material to be welded is heated by electric resistance.

More precisely, this technique entails pressing at least one electrode against the parts to be welded and then having an electric current pass through the electrode and the parts; owing to the Joule effect, the current causes the localized heating of the point of contact between the parts and the electrode, up until the liquefaction of the material involved and the consequent welding.

Likewise it is known that to ensure an excellent weld, it is necessary to suitably adjust three parameters and keep them under control: the current intensity, the welding time, and the force exerted on the parts during welding.

While for the first two parameters indicated above efficient instruments are now known which are capable of controlling and adjusting the desired values with adequate reliability, to date none of the various different solutions adopted for controlling the welding force has been found to be entirely satisfactory.

In some cases in fact, use is made of gauges and pressure regulator valves, which apply an “indirect” control, in that they make it possible to read and control a preset pressure circuit value, which, multiplied by the cross-section of the cylinder that pushes the electrode, should make it possible to obtain the desired force. However, the gauge reads the pressure level at a point of the circuit that is more or less distant from the pusher cylinder and therefore it cannot take account of the sliding friction of the latter and of its negative weight, or of the forces that develop with the welding and which can oppose the action of the pusher cylinder when working “off-axis” (when the welding electrode is not coaxial with the cylinder).

So in fact, electric resistance welding machines that use gauges and regulator valves are not capable of developing a force value corresponding to the desired value: the factors listed above, which can vary unpredictably with each welding cycle, determine oscillations and deviations that are often unacceptable, especially when the repeatability of the welding process constitutes a critical factor.

Other electric resistance welding machines try to control the welding force by using sensors that are capable of measuring the deformation of the structure of the machine itself, which occurs during the welding phase by virtue of the forces developed. Owing to the disturbance and interference that the high currents in play produce, these sensors are positioned at a considerable distance from the weld point, and this renders such machines subject to the same drawbacks described for the previous type, in that it is not possible to take proper consideration of those force components that are dissipated by friction between the various components of the movable stem of the cylinder. Therefore, it is not possible to know the exact value of the force that the welding electrodes apply to the layers of material to be welded.

Both of the approaches described above are also afflicted by further inaccuracies, owing for example to the concerned temperatures (which alter the yield of the system by causing a further change in force at the electrodes) and to the hysteresis effect, to which the measurement components are subjected and which occurs when passing from a higher adjustment value to a lower value and vice versa.

For these reasons, and given the impossibility of obtaining definite information about the forces that develop during welding, from time to time the operator is forced to stop production in order to carry out a check of the actual force applied at the electrodes, by interposing a force measurement instrument (for example a sample load cell) between them, and then make the necessary adjustments.

However, it needs to be considered that this check is typically carried out without the flow of current at the electrodes, therefore the force value read and the consequent new adjustment will not correspond to the working conditions that arise during welding, during which, moreover, the flow of current between the electrodes produces an electromagnetic force contrary to the direction of the force applied and therefore able to subtract force from the contact of the electrodes.

SUMMARY

The aim of the present disclosure is to solve the above mentioned problems, by providing a welding apparatus that is capable of executing an optimal measurement of the welding force, i.e. the force with which the electrode or electrodes are pressed against the parts to be welded.

Within this aim, the disclosure provides a welding apparatus that is capable of executing a reading and a correct adjustment of the welding force, independently of the position of the electrode with respect to the axis of the pusher cylinder.

- the disclosure also provides a welding apparatus that is capable of executing an optimal measurement of the welding force, without being affected by distortions owing to electromagnetic forces and other disturbance effects that are generated during the welding itself.

The disclosure further provides a welding apparatus that ensures a high reliability of operation.

The disclosure also provides a welding apparatus that adopts an alternative technical and structural architecture to those of conventional apparatuses.

- the disclosure further provides a welding apparatus that can be easily implemented using elements and materials that are readily available on the market.
- the disclosure also provides a welding apparatus that is of low cost and safely applied.

This aim and these and other advantages which will become better apparent hereinafter are achieved by providing a welding apparatus according to claim 1.

BRIEF DESCRIPTION OF THE DRAWINGS

Further characteristics and advantages of the disclosure will become better apparent from the detailed description that follows of a preferred, but not exclusive, embodiment of the welding apparatus according to the disclosure, which is illustrated by way of non-limiting example in the accompanying drawings wherein:

FIG. 6 is an exploded perspective view from above of the measurement device;

FIG. 7 is a perspective view from above of the measurement device of FIG. 6;

FIG. 8 is a perspective view from below of the plate of the measurement device of FIG. 6;

FIG. 9 is a view from below of the plate of the measurement device of FIG. 6;

FIG. 10 is a cross-sectional view of FIG. 9, taken along the line X-X;

FIG. 11 is a cross-sectional view of FIG. 9, taken along the line XI-XI;

FIG. 12 is a greatly enlarged detail of FIG. 11;

FIG. 13 is an exploded perspective view from above of the measurement device;

FIG. 14 is a perspective view from below of the plate of the measurement device of FIG. 13;

FIG. 15 is a view from below of the plate in FIG. 14;

FIG. 16 is a cross-sectional view of FIG. 15, taken along the line XVI-XVI; and FIG. 17 is a cross-sectional view of the plate of FIG. 14, taken along a plane perpendicular to the longitudinal axis.

DETAILED DESCRIPTION OF THE DRAWINGS

Figure 1:
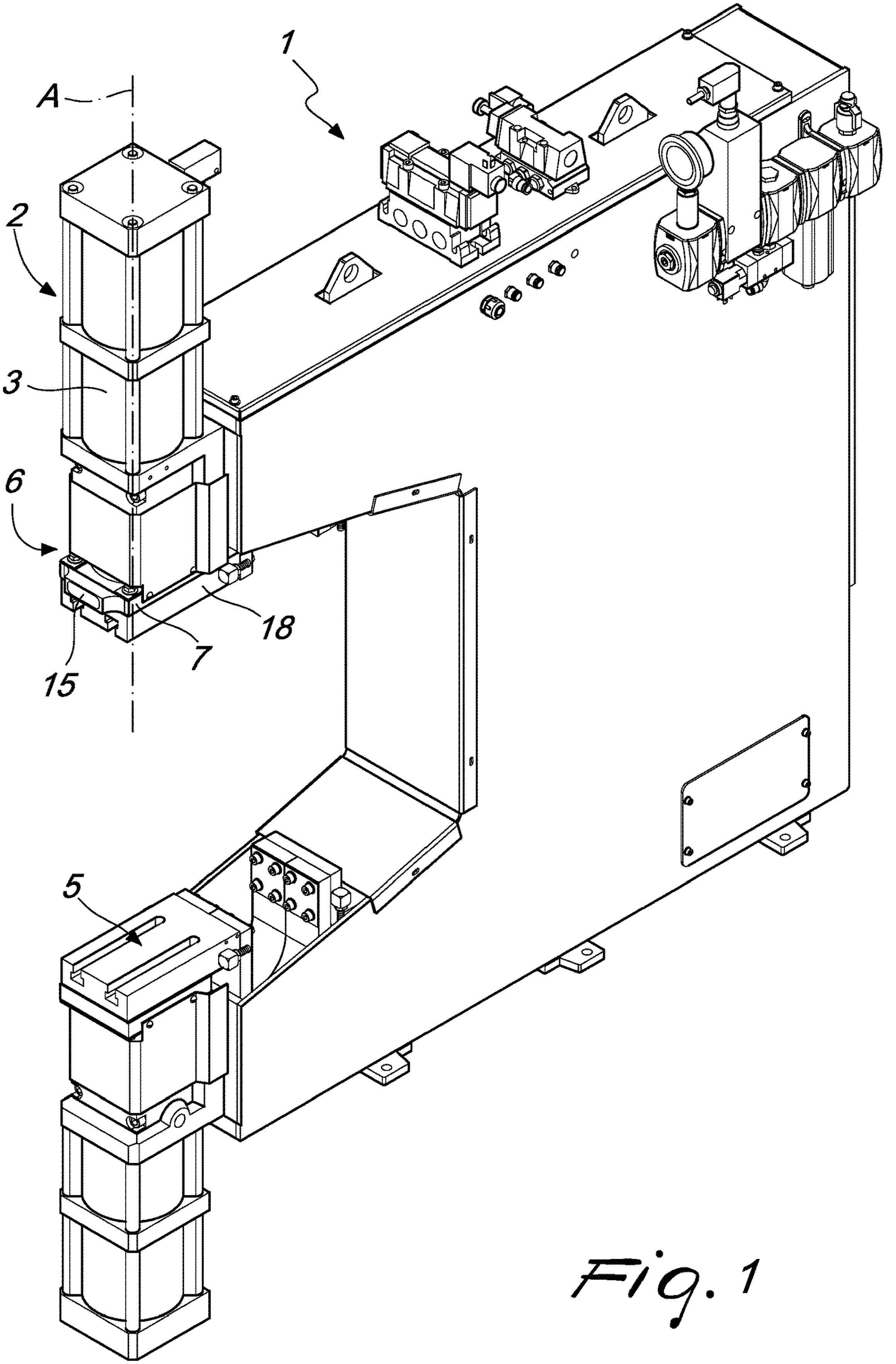
FIG. 1 is a right-hand front perspective view of the welding apparatus according to the disclosure.
Figure 2:
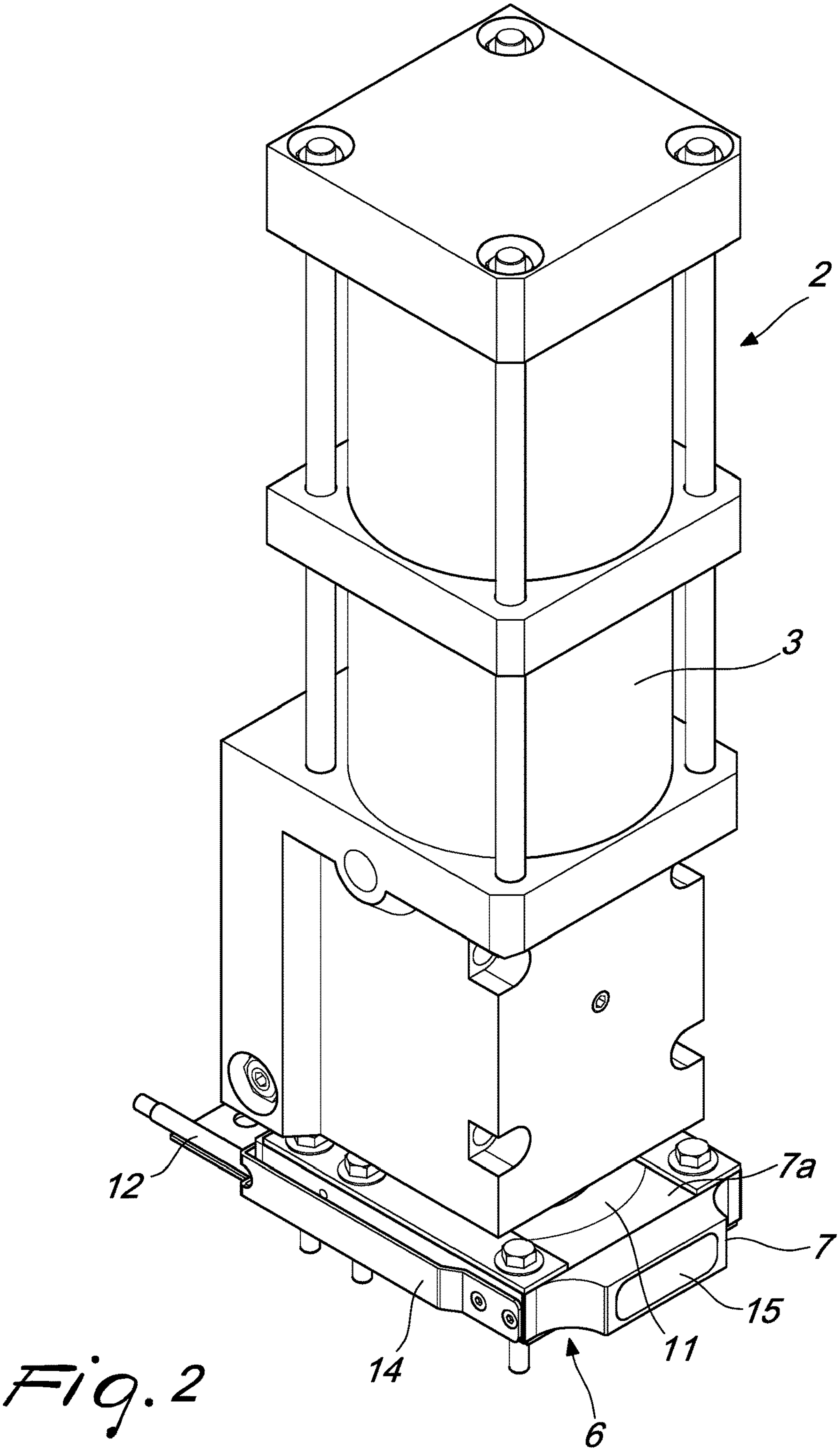
FIG. 2 is a left-hand front perspective view of a subassembly of the welding apparatus of FIG. 1, which comprises the cylinder and the measurement device.
Figure 3:
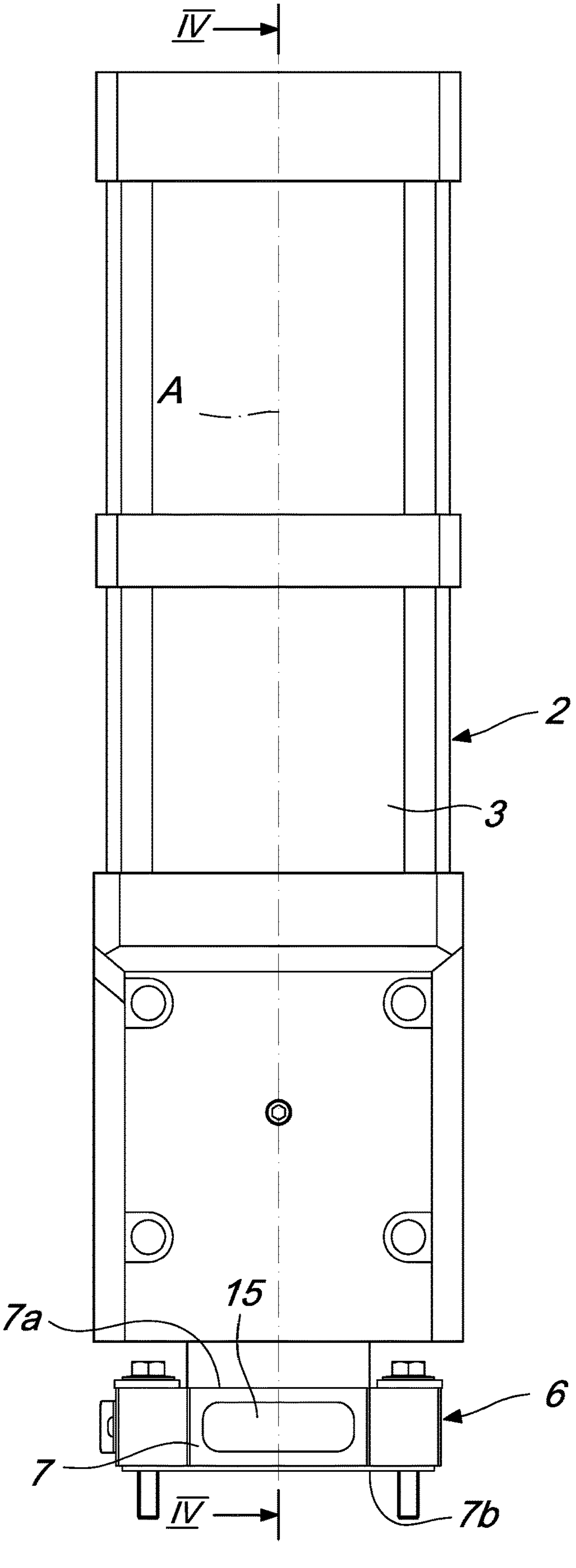
FIG. 3 is a front elevation view of the subassembly of FIG. 2.

With particular reference to the figures, the reference numeral 1 generally designates a welding apparatus according to the present disclosure, which comprises a movement assembly 2 for at least one electrode (not shown in the accompanying figures, but in any case per se known). This electrode can be passed through by current for the execution of welding treatments, on two or more parts to be welded together which are arranged along the movement trajectory (alternating translation) of the electrode.

In more detail, the assembly 2 comprises at least one cylinder 3 (typically of the pneumatic, hydraulic or oil hydraulic type) and at least one stem 4 which rigidly supports the electrode (indirectly, as will be seen): in more detail, the stem 4 is at least partially accommodated in the cylinder 3 and is coaxially movable with an alternating straight motion along the longitudinal axis A of the cylinder 3, so as to be able to press the electrode against the parts to be welded with a corresponding welding force. According to methods that are known per se, the welding force develops when, during the stroke of extraction (partial or total) of the stem 4 from the cylinder 3, the electrode supported by this stem 4 is brought into contact with the parts. When welding is complete, the stem 4 can then reenter the cylinder 3 (as part of its alternating straight movement), in order to facilitate the removal of the welded pieces and prepare the apparatus 1 for execution of another treatment.

More precisely, according to methods that are known per se, the apparatus 1 typically defines a supporting surface 5, on which the parts to be welded (a pair of metal sheets for example) can be placed and which effectively is arranged along (or at the end of) the stroke that the electrode can travel, so that the electrode can press the parts against the surface 5 and, passed through by current, perform the weld.

At the surface 5, a second electrode can act (from the opposite side) or in any case it can be the parts themselves that allow the flow of current.

In any case, up to this point the techniques and methods are known per se and it is therefore not necessary to discuss them further.

It should also be noted that in the preferred application the apparatus 1 is configured to carry out electric resistance welding treatments (in the various known types), whereby the parts to be welded are heated by electric resistance while the electrode presses them against the surface 5 (or, more generally, they are clamped between corresponding electrodes).

In any case the possibility is provided for that the apparatus 1 according to the disclosure can be used to carry out welding treatments of another type.

According to the disclosure, the apparatus 1 comprises a measurement device 6 for the welding force: in more detail, and as will be better explained below, the device 6 measures the value of the force with which the stem 4 and the respective electrode press against the parts to be welded, during the welding itself.

The device 6 comprises a plate 7, which is stably interposed between the stem 4 and the electrode with the respective faces 7*a*, 7*b* arranged at right angles to the longitudinal axis A. As is intuitively recognized, even from the accompanying figures, the faces 7*a*, 7*b* of the plate 7 are identified by the two larger dimensions of the plate 7 (the third, the thickness or height, being therefore aligned with/parallel to the longitudinal axis A).

The plate 7 is preferably but not exclusively made of non-magnetic metallic material, with a shape that is practically rectangular (as in the accompanying figures), square, circular or the like.

Figure 9:
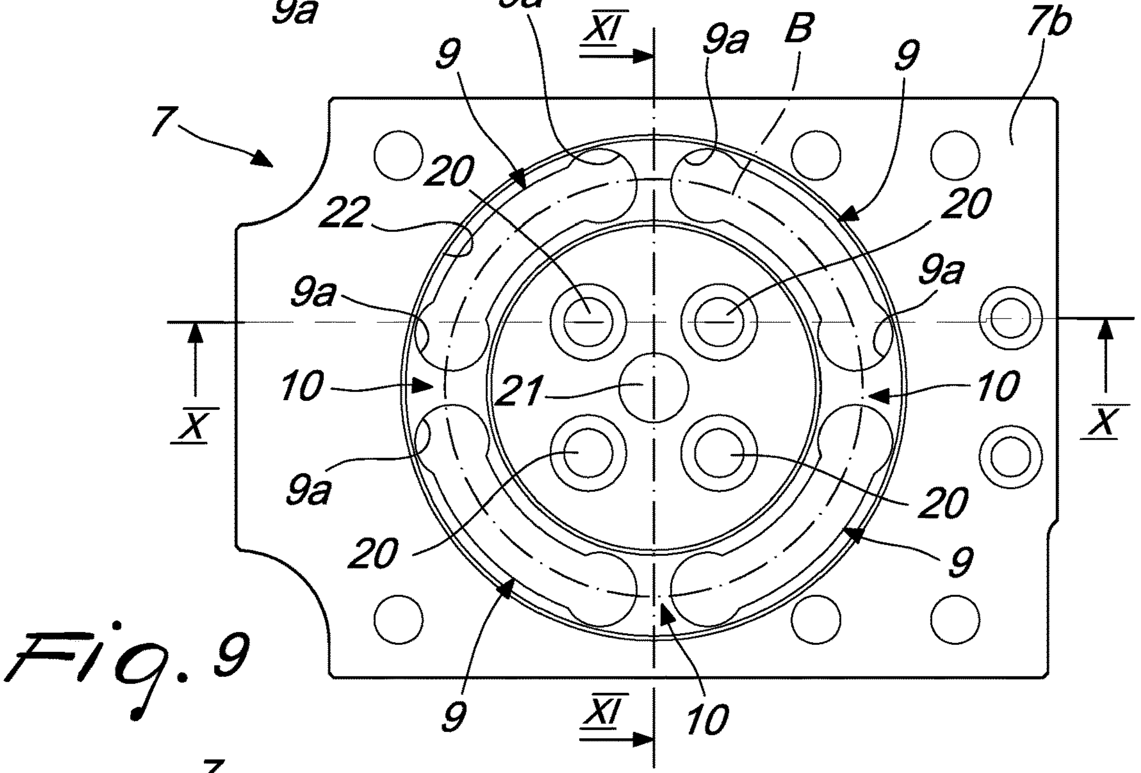
Figure 10:
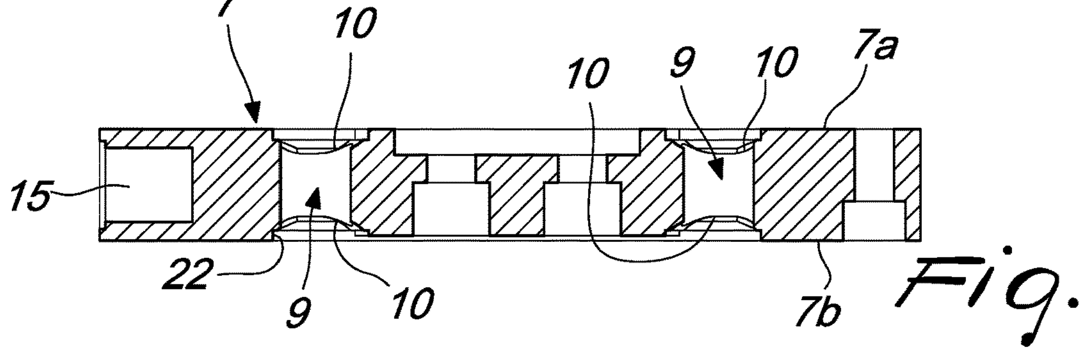
Figure 11:
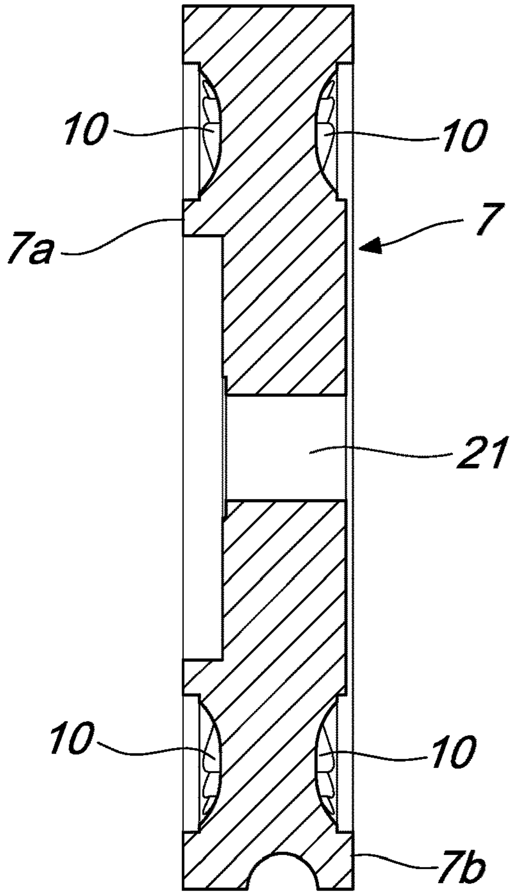
Figure 12:
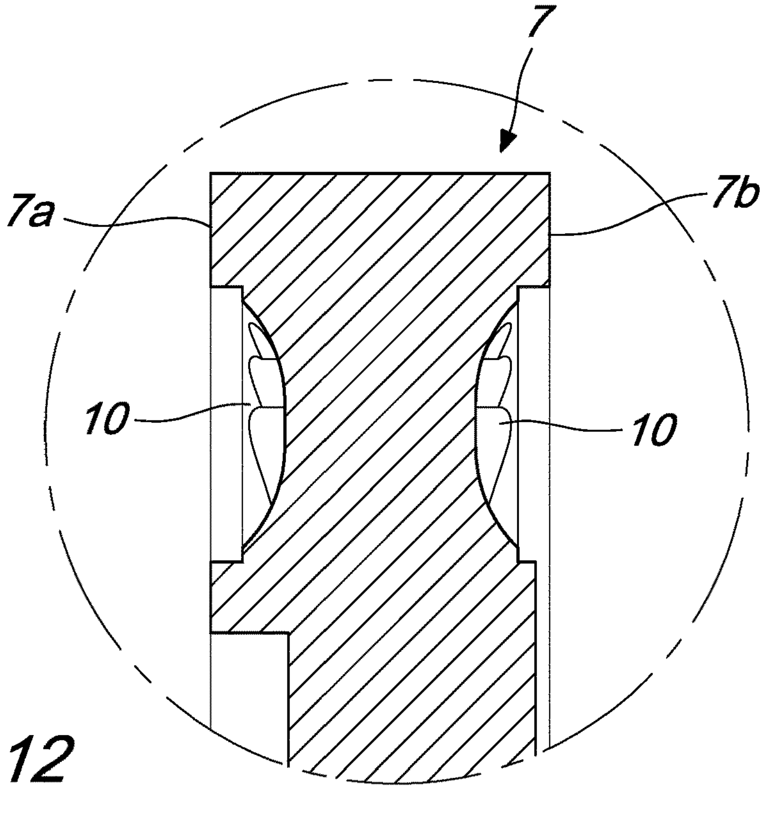
Figure 15:
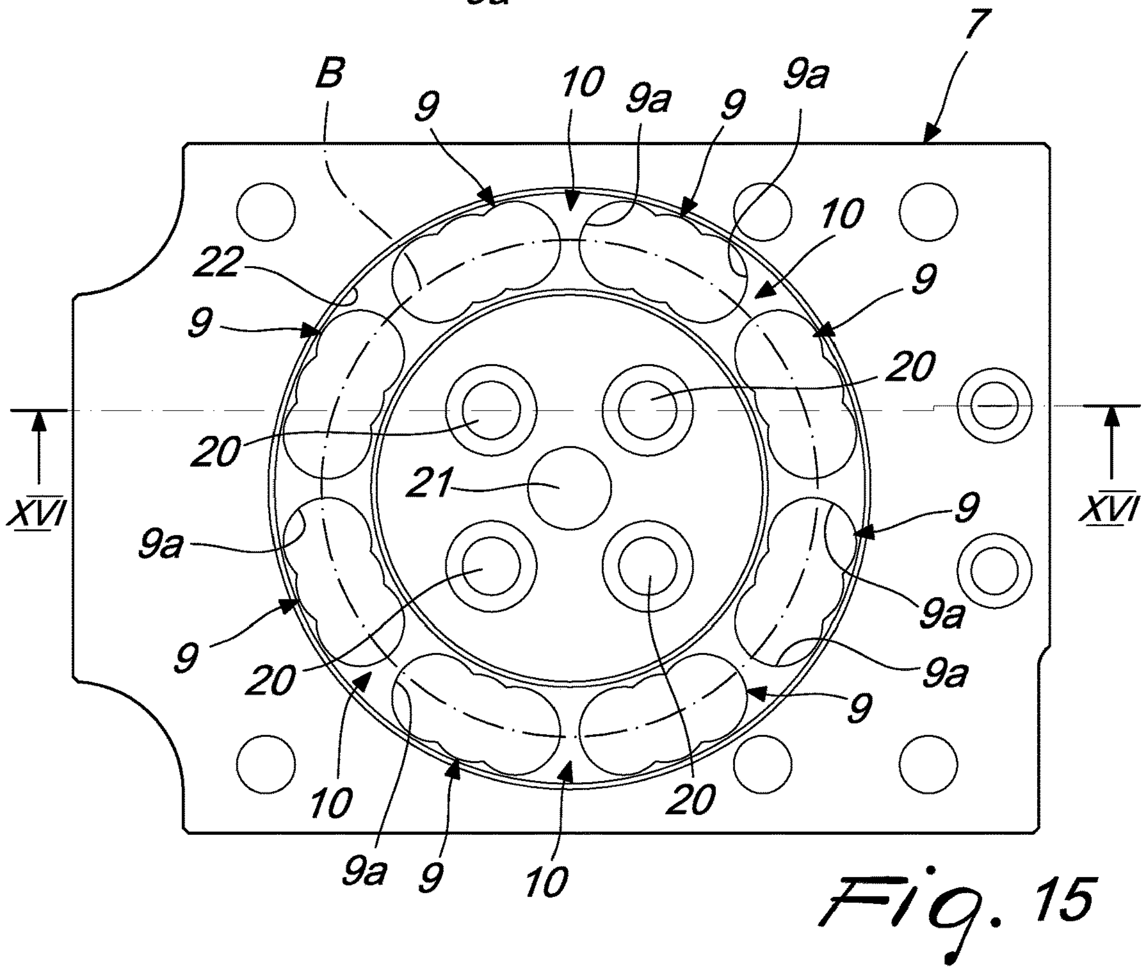
Figure 16:
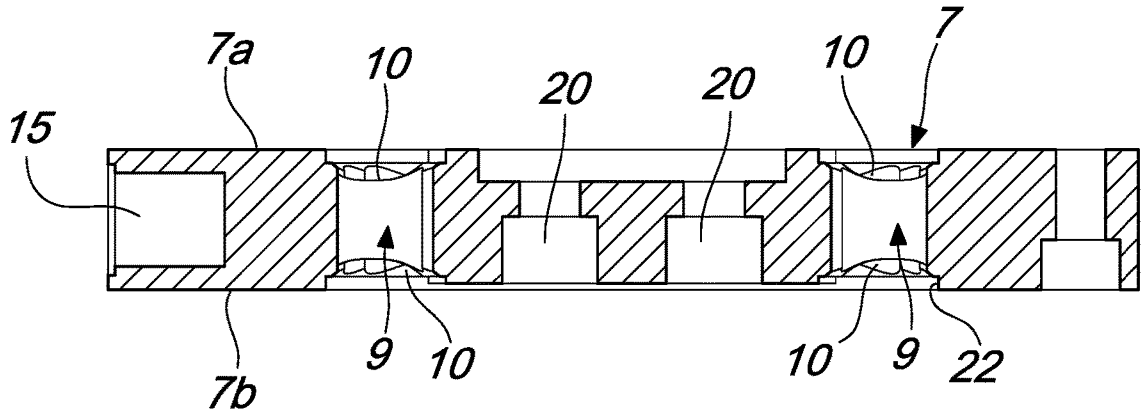
Figure 17:
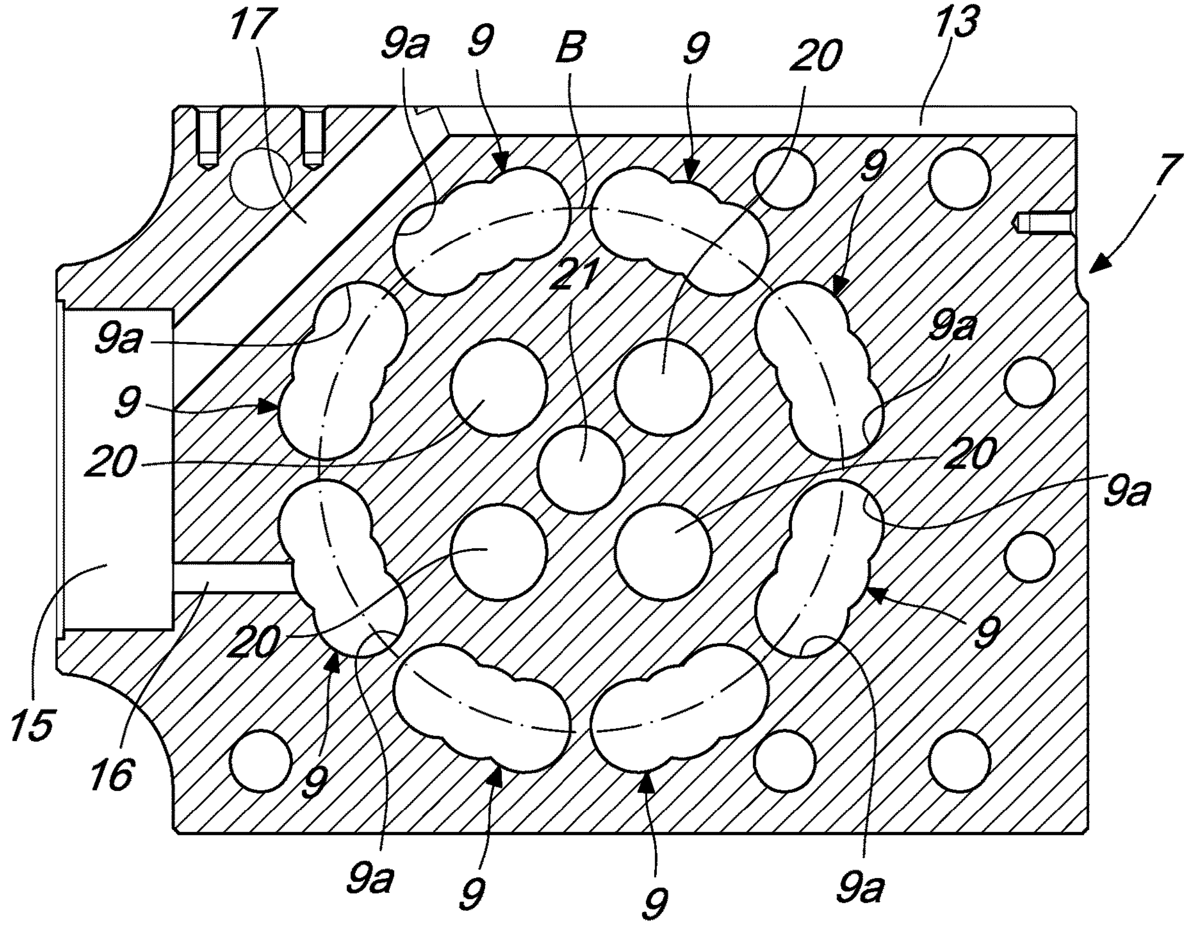

Furthermore, the device 6 comprises a plurality of deformation sensors 8 (shown for the sake of simplicity in FIG. 13 only), which are accommodated in through slots 9, which in turn are provided in the plate 7 and are distributed along an imaginary circumference B (when observed from above or from below the plate 7) which is centered along the longitudinal axis A (and the outline of which is shown in FIGS. 9, 15 and 17).

The sensors 8 measure the deformation of the plate 7 which, being placed in direct contact with the electrode or with the element that supports it (as will become better apparent below) and/or in any case in the immediate vicinity of the weld point, is deformed by (solely) the welding force developed. The reading obtained by the sensors 8 therefore makes it possible to obtain an optimal measurement of the welding force without any interference or distortion being able to influence or alter the values read. Therefore from this point onward the set aim is achieved.

In particular, according to two embodiments of particular practical interest, the plate 7 has a number of slots 9 equal to four (as in the solution of FIGS. 6-12) or eight (FIGS. 13-17), with these slots 9 in both cases having mutually identical dimensions and being regularly distributed along the imaginary circumference B. The circumferential extent of the slots 9 (i.e. measured along the imaginary circumference B) is such as to leave little space (between five and ten millimeters for example) between the end of one slot 9 and the start of the next one. In any case, the remaining sections of the portions of plate 7 comprised between the end of one slot 9 and the start of the next one are conveniently calculated with regard to the type of material used, the maximum load of the cylinder 3 and, more generally, the minimum and maximum expected deformation.

It should in any case be noted that the scope of protection claimed herein comprises plates 7 provided with any number of slots 9, which need not be identical to each other and/or are not necessarily distributed in a regular manner around the imaginary circumference B.

Figure 13:
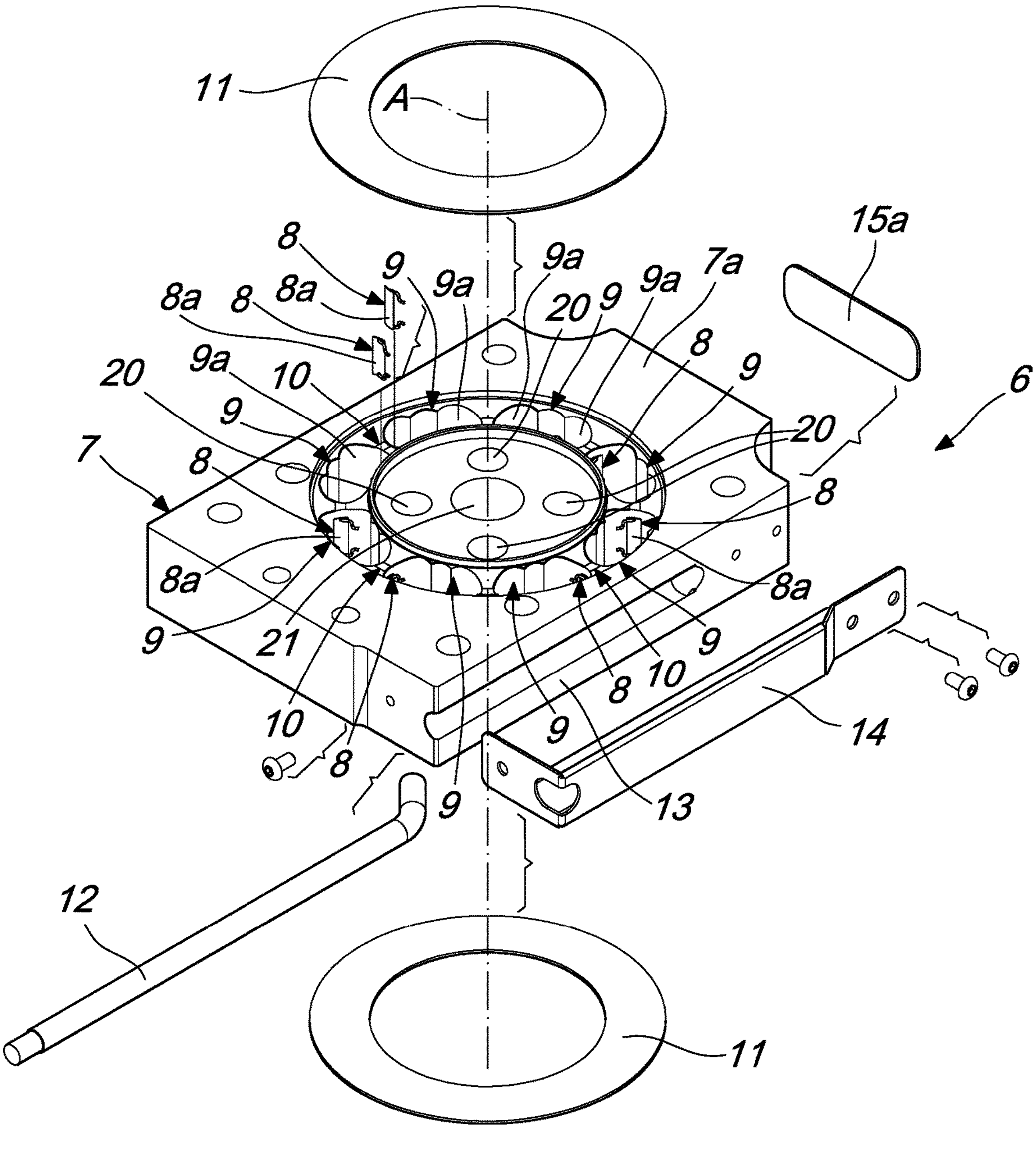
FIGS. 13 to 17 show the measurement device according to the disclosure in the second embodiment, more specifically.
Figure 14:
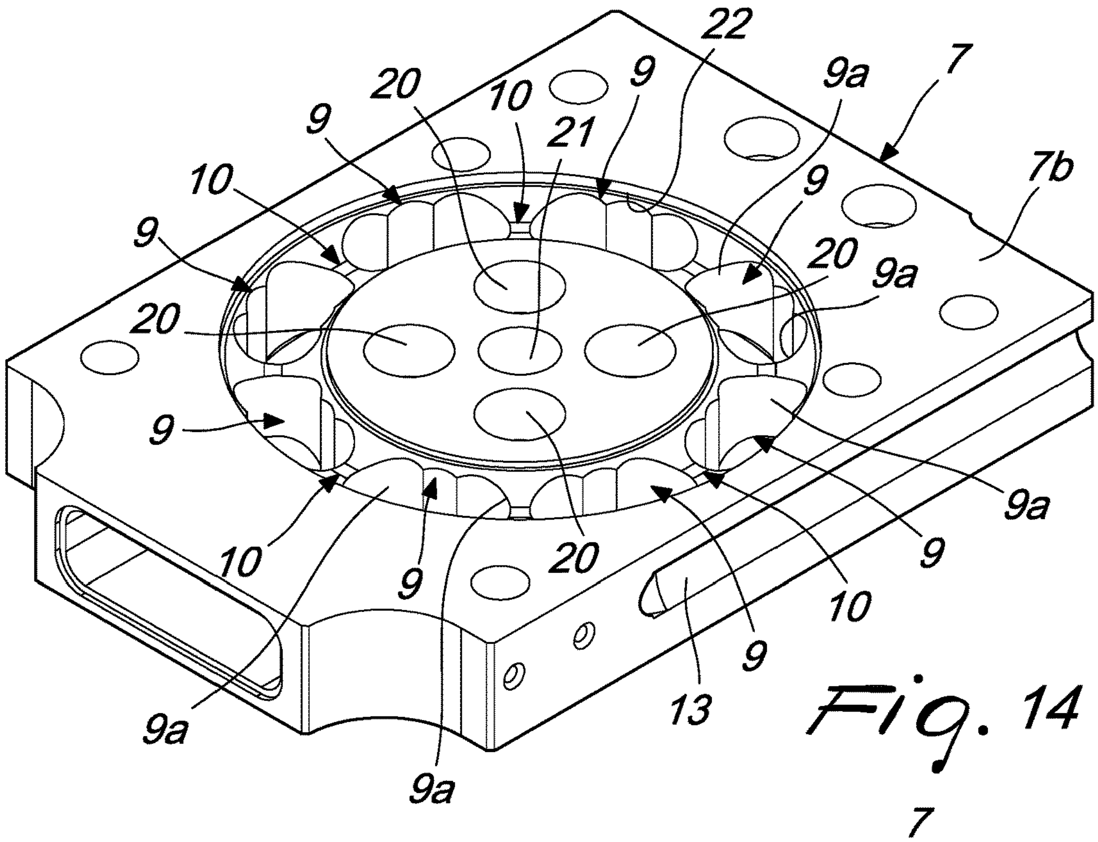

In the preferred embodiment, also illustrated in FIG. 13 for the purposes of non-limiting example of the application of the disclosure, each sensor 8 is an electric resistance strain gauge, which comprises a rigidly deformable element applied on a laminar support 8*a*. In turn, this support 8*a* is rigidly applied to one of the two end walls 9*a* of the respective slot 9, which are located mutually opposite along the imaginary circumference B.

As is known, as a consequence of the deformation of the object on which the support 8*a* (the plate 7) is applied, caused by the stress to which that object is subjected, the deformable element deforms in its turn, thus varying the electric resistance that opposes the flow of current: this variation is suitably measured and makes it possible to find the value of deformation and therefore of force applied to the plate 7.

In the preferred embodiment, which makes it possible to obtain an even more precise measurement of the welding force, and with further reference to the accompanying FIG. 13, each slot 9 (whatever their number) accommodates a pair of strain gauges (or even of other sensors 8), which are applied to the respective end walls 9*a* (or arranged at another point of the slots 9). The possibility is envisaged of making the two sensors 8 of the same slot 9 adhere at the same axial height (i.e. measured along the longitudinal axis A) or at different heights, according to the specific requirements.

The presence of two or more sensors 8, be they strain gauges or another type, accommodated in the same slot 9 or even in different slots 9, makes it possible to auto-compensate the final result and make it, as an absolute value, independent of the position of application of the welding force.

Usefully, each face 7*a*, 7*b* of the plate 7 has, between each pair of adjacent slots 9, an accommodation groove 10 for electrical connections (wires or the like) of the sensors 8, and in addition each groove 10 is effectively arranged along the imaginary circumference B.

Figure 4:
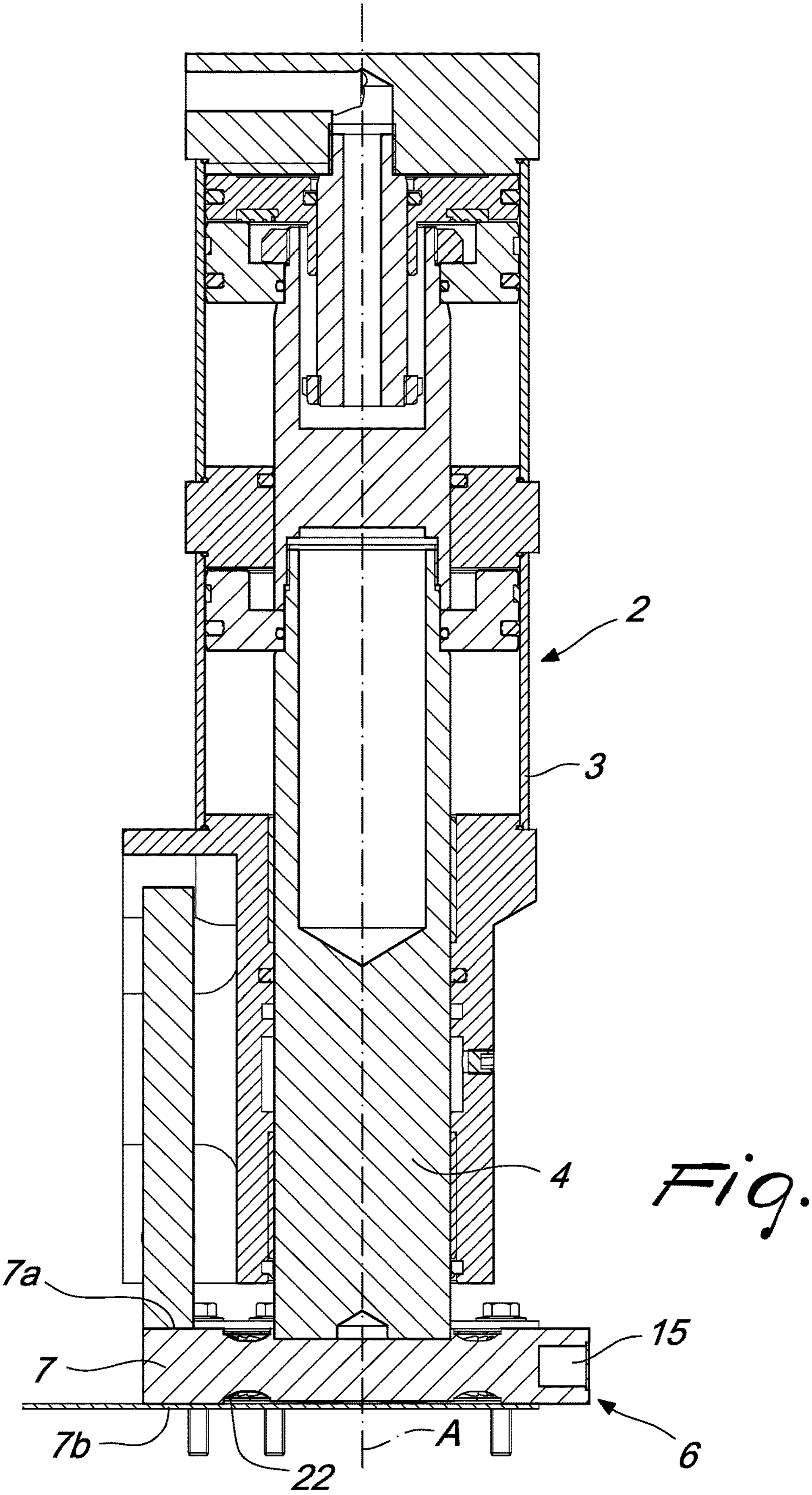
FIG. 4 is a cross-sectional view of FIG. 3, taken along the line IV-IV.
Figure 5:
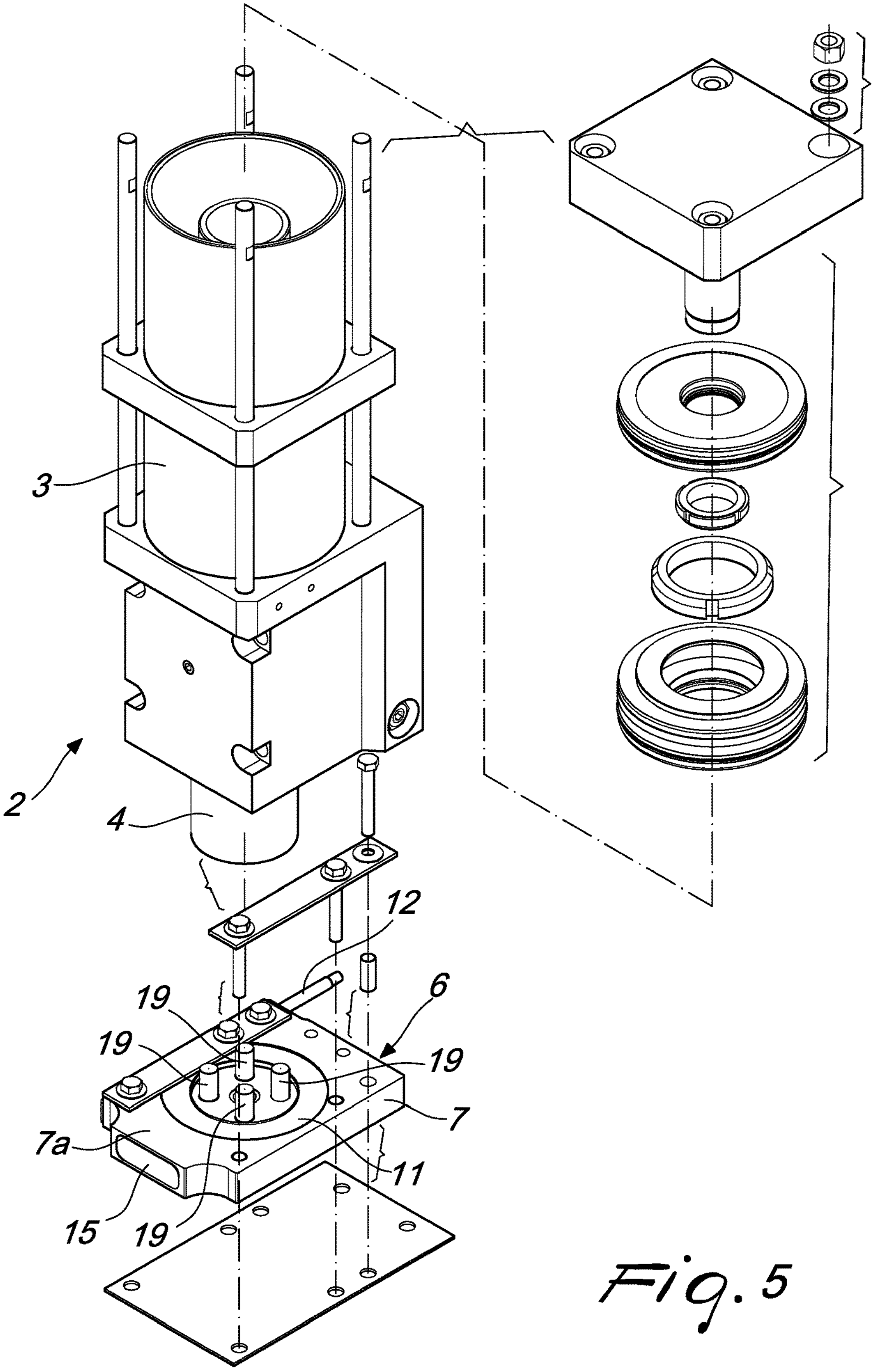
FIG. 5 is a right-hand exploded front perspective view of the subassembly of FIG. 2.
Figure 6:
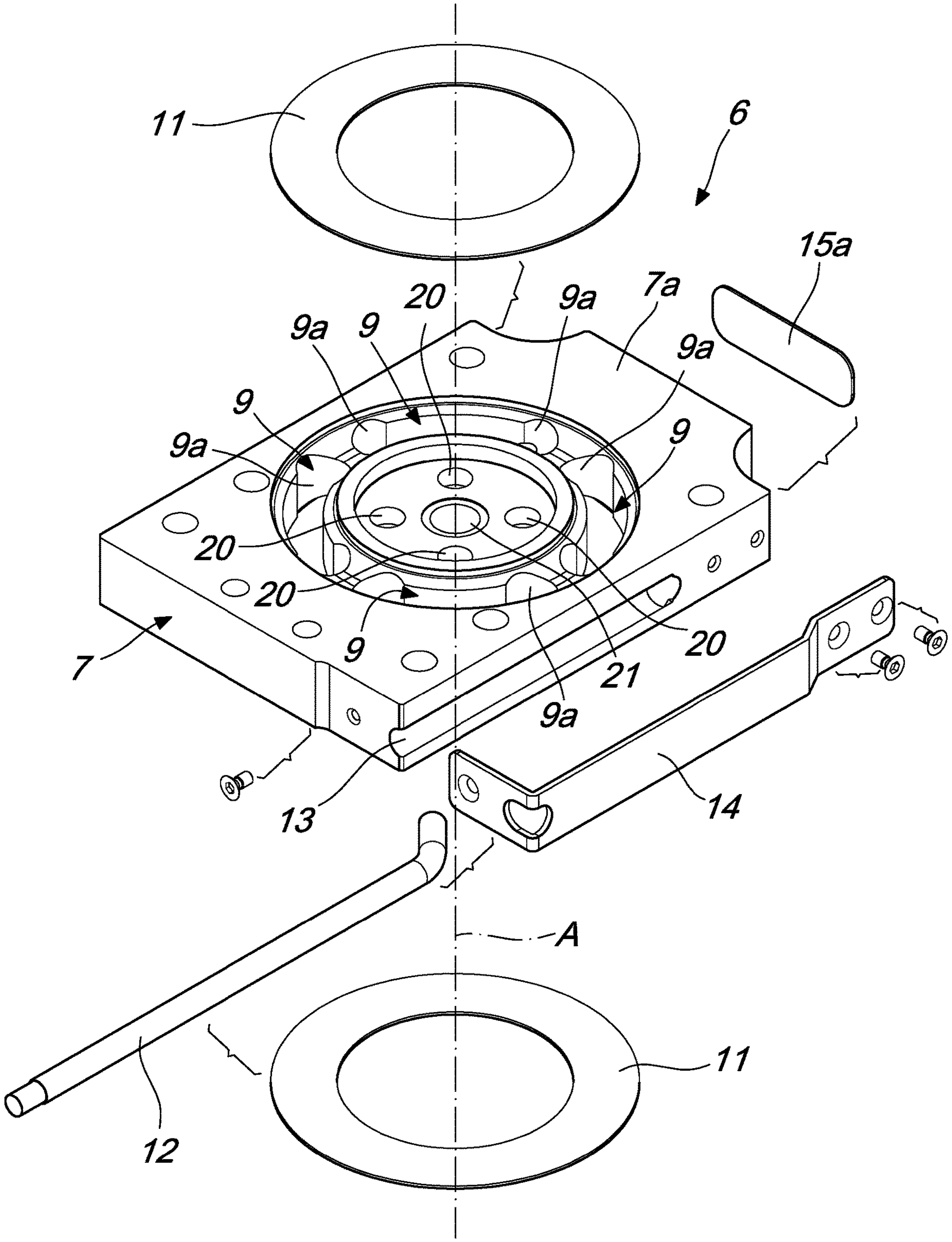
FIGS. 6 to 12 show the measurement device according to the disclosure, without the deformation sensors, in the first embodiment, more specifically.

For the sake of simplicity, the electrical connections are not shown in the accompanying figures (except, schematically, for the terminals connected to the sensors 8 of FIG. 13), but they are known per se and therefore easily intuited for the person skilled in the art. The grooves 10 (preferably but not exclusively with a semicircular bottom or a bottom that is otherwise rounded) effectively define a recess in which to arrange the electrical connections between the sensors 8, without the risk that they could be crushed or damaged when the faces 7*a*, 7*b* are made adhere to the surrounding elements of the apparatus 1 (as will be better explained below or as can be clearly seen in FIG. 1 or 4).

Precisely in order to ensure an optimal protection of the sensors 8 (and of the respective electrical connections) used to measure the deformation and therefore the force, advantageously the slots 9 and the grooves 10 are closed by respective annular protective plugs 11, which are applied on the corresponding faces 7*a*, 7*b* of the plate 7 and which are in turn arranged along the imaginary circumference B.

The annular plugs 11 prevent dust, debris, and other kinds of impurities from entering the plate 7, thus preserving the integrity and the functionality of the components accommodated in the slots 9 and in the grooves 10.

Conveniently, the welding apparatus 1 comprises an electronic control and management unit, which is configured for the actuation of the movement assembly 2 and the adjustment of the intensity of the welding force. This unit comprises instructions for adjusting the intensity of the welding force on the basis of the data collected by the sensors 8, which are controlled to this end by the unit itself.

The electronic unit can be of any type, and for example it can be an electronic controller mounted on board the apparatus 1; the possibility is not ruled out however of using different types of electronic unit (mounted or not on the apparatus 1), which therefore may be any hardware platform, reprogrammable or otherwise, that can in any case act on the intensity of the welding force and/or on the stroke of the stem 4.

In more detail, the electronic unit is configured to compare the value of the welding force that actually develops in a determined weld cycle (treatment) (which typically has a duration of a few tenths of a second) with the preset force value. In the event of deviations, first of all an immediate intervention can be made during that very cycle, but more commonly (given the very short duration of the single cycle), the detection of the deviation ensures that the unit will automatically make corrections at the next cycle, in order to compensate that deviation. From a practical point of view, in order to set, control and modify the welding force, the electronic unit can for example act on the circuit pressure (by way of a proportional servo valve) of the circuit responsible for the movement of the stem 4, modifying it in order to reach and maintain the desired load.

Advantageously, the measurement device 6 comprises a connecting cable 12 for connecting the sensors 8 to a signal converter, in order to transfer the data collected by those sensors 8 to the electronic control and management unit. In other words therefore, the deformations of the sensors 8, during the application of the load generated by the assembly 2, are converted to electrical signals and then processed by the electronic unit, which is capable for example of returning the load applied expressed in daN.

The connecting cable 12 is at least partially accommodated in a track 13 which is provided along a side of the plate 7 and placed, directly or indirectly, in communication with the slots 9 (where the sensors 8 are accommodated).

Like the grooves 10, the track 13 makes it possible to have a practical accommodation in the plate 7 for the connecting cable 12, without making it protrude from the bulk of the plate 7 itself, and therefore keeping it protected.

Figure 7:
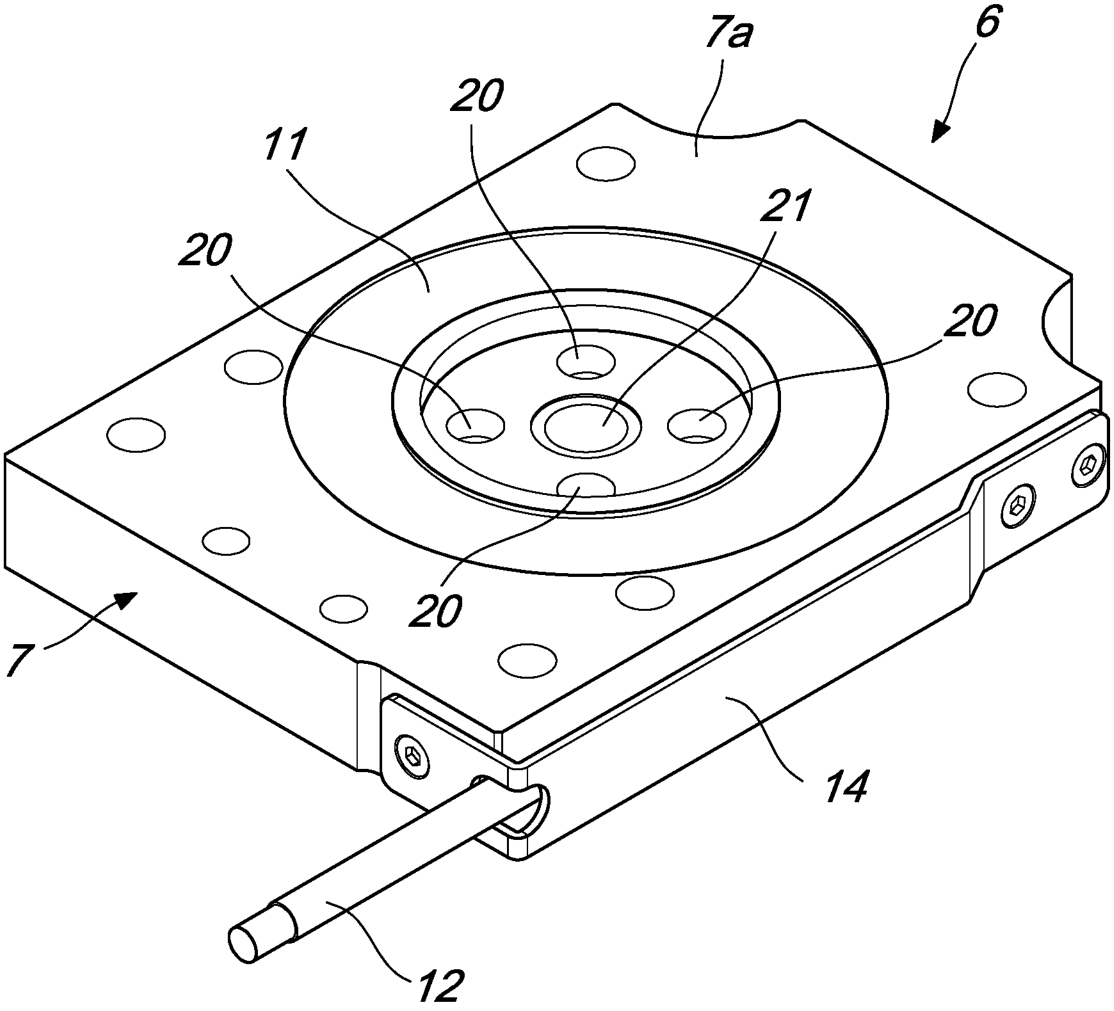
Figure 8:
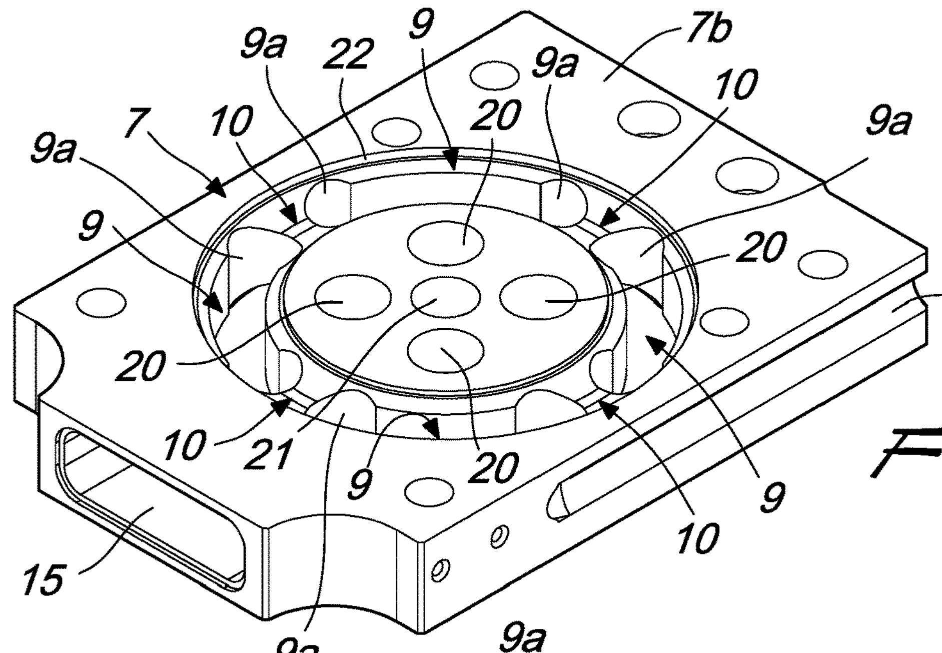

Precisely in order to ensure greater protection, the track 13 is preferably closed by an insert 14 (metallic or made of another material), applied on the corresponding side of the plate 7 and perforated in order to allow the connecting cable 12 to come out (as can clearly be seen for example from FIG. 7).

Usefully, the plate 7 has a lateral pocket 15, which is arranged directly or indirectly in communication with the slots 9 and which accommodates electronic components associated with the sensors 8 and the external electrical connection terminals of those sensors 8.

For example, and as shown in FIG. 17, the possibility exists that the pocket 15 communicates with one of the slots 9 by way of a first cylindrical hole 16 (and therefore, by virtue of the grooves 10, the pocket 15 is also in communication with the other slots 9).

In this way, it is possible to mutually connect all the sensors 8 with what is accommodated in the pocket 15. Furthermore, a second cylindrical hole 17 connects the pocket 15 with the track 13, in order to complete the connections between the various components, all effectively kept within the bulk of the plate 7.

It should be noted that the pocket 15 can also be closed by a contoured plug 15*a*, for the same purposes of protection described previously for the annular plug 11 and the insert 14.

In the preferred embodiment, which in any case does not limit the application of the disclosure, a first face 7*a* of the plate 7 is stably anchored to the free end of the stem 4, while the second face 7*b* of the plate 7, which is opposite to the first face 7*a*, is stably anchored to a supporting block 18 of the electrode.

In more detail, the plate 7 is made integral with the stem 4 by way of a series of first screws 19 which are inserted in corresponding first holes 20 provided along the plate 7 (distributed equally about the longitudinal axis A). The region of contact between the stem 4 and the plate 7 effectively corresponds to the outside diameter of the stem 4 (with the exception of an additional central hole 21 for the egress of electrical cables): in this manner the coupling between the stem 4 and the plate 7, created by the tightening of the first screws 19, does not create any deformation on the plate 7.

Likewise, and with further reference to the preferred, but not exclusive, embodiment, on the opposite side from the contact with the stem 4 and therefore along the second face 7*b*, there is a circular shallow recess 22 which is coaxial with the longitudinal axis A, and with wider dimensions than the diameter of the stem 4. In this manner the resting surface of the plate 7 on the supporting block 18 can correspond to the entire second face 7*b* of the plate 7 minus the surface of the shallow recess 22, in the area outside the diameter of the stem 4.

It should likewise be noted that at the portions of plate 7 comprised between the end of one slot 9 and the start of the next one (along the imaginary circumference B) there is axial “continuity” (there are no empty spaces or cavities) between the stem 4 and the block 18: these portions are preferably arranged along the primary working direction and the secondary working direction.

The operation of the welding apparatus according to the disclosure is the following.

As seen, the supporting block 18 of the electrode (or in any case the electrode) is anchored to the stem 4 which in turn can perform an alternating straight motion along the longitudinal axis A. In this manner, the apparatus 1 acts as a press and the electrode, when it reaches or moves toward the limit position of maximum extraction from the cylinder 3, is brought under pressure against the two parts which have previously been arranged on the surface 5, thus making it possible to carry out the welding of those parts (according to various techniques, including preferably but not exclusively electric resistance welding).

The methods and the elements involved in carrying out the welding are per se of the conventional type; what is peculiar of the disclosure is the adoption and the structure/configuration of the measurement device 6 which as seen, is interposed between the free end of the stem 4 and the electrode (between the stem 4 and the block 18).

The device 6 comprises a plate 7 which defines internally, with the slots 9, the accommodations for the sensors 8 for measuring the deformation that will occur on the plate 7 when the stem 4 pushes the electrode against the parts to be welded and exerts the necessary welding force.

Since the plate 7 is placed in direct contact with or in the immediate vicinity of the weld point (of the electrode or of its supporting block 18) the deformation of the plate 7 read by the sensors 8 is the deformation due to the welding force imparted to the parts, without this reading being influenced by the disturbing factors that afflict the readings made by sensors that, according to conventional methods, are located more or less distant from the weld point. The sliding friction of the stem 4, its negative weight, the dissipations and other reactions that can develop during the welding, and which make their effect felt at a distance from the weld point, do not influence in any way the reading of the sensors 8, which is kept absolutely accurate and precise.

The slots 9 offer shelter and protection to the sensors 8 against any disturbance, force or interference caused by the currents (which are high intensity) that pass through the electrode during the welding and this makes the sensors 8 insensitive to such disturbances. Precisely for this reason the disclosure makes it possible to position the sensors 8 in the immediate vicinity of the weld point and to read the force in real time, during the execution of the treatment.

Thus it has been seen that the apparatus 1 according to the disclosure fully achieves the set aim, in that it is capable of executing an optimal measurement of the welding force, i.e. the force applied on the parts to be welded, during the actual welding, thus eliminating any process uncertainty.

Precisely because the plate 7 is in contact with the electrode and/or the corresponding block 18, with the sensors 8 arranged along the longitudinal axis A, the readings taken by these sensors are absolutely precise and correct even when the electrode is not aligned with the longitudinal axis A (as occurs in some applications). The apparatus 1 is therefore capable of executing a reading and a correct adjustment of the welding force, independently of the position of the electrode with respect to the longitudinal axis A of the cylinder 3. This represents an undoubted and further advantage of extreme practical interest, achieved by the disclosure, in that it is known that one of the main problems associated with the use of load cells, which are sometimes used in conventional apparatuses to detect welding forces, is indeed linked to the fact that such systems, owing to how they are designed, are sensitive to the position of the closing point of the electrodes with respect to the position of the force sensor adopted.

It has furthermore been seen that the plate 7, with the grooves 10, the track 13 and the pocket 15 (and also the cylindrical holes 16, 17), make it possible to accommodate, screen and protect all the components necessary to the operation and to the functional connection of the sensors 8 (by virtue also of the plugs 11, 15*a* and the insert 14), once again making the measurement carried out by the device 6 reliable and precise (because it is insensitive in every part thereof to distortions and interference).

Via an interface associated with the electronic unit for example, the operator can program the various parameters associated with carrying out the welding cycle, such as for example: the direct force value (in daN) to be applied to the electrodes during the welding phase, the time in seconds or milliseconds to carry out the step of approaching the upper electrode (the one supported by the stem 4), the current value (in Amperes) necessary for the welding effect, the time in seconds or milliseconds to carry out the welding.

It is again emphasized that the apparatus 1 according to the disclosure does not require information about the position of the electrode with respect to the longitudinal axis A, as it has already been seen that this does not influence the readings of the device 6.

Purely for the purposes of example (and certainly not limiting of the application of the disclosure), a possible welding cycle can involve the following values: welding force equal to 500 daN, approach time equal to 0.2 seconds, current value equal to 40,000 A and welding time equal to 0.3 seconds.

At this point, on starting the cycle in sequence there are the following steps: descent of the stem 4 supporting the upper electrode for the set approach time, determination by the electronic unit through feedback to the servo valve of the necessary pressure for the cylinder 3 to impart the set welding force, and when the device 6 detects that the force applied to the electrodes corresponds to the desired value the welding is begun, by sending current to the electrodes for the programmed length of time and intensity.

The disclosure is therefore capable of directly and independently controlling and managing every single step of every single welding cycle.

This represents another advantage of the disclosure, in that with the known solutions often the operator has to set a time value that includes all the cycle steps, thus obtaining a different welding effect between one cycle and another (for example, less time used in the electrode approach step results in lengthening the time for the next step in the cycle and so on) thus generating considerable productive variability.

It should be noted finally that any deviations between readings obtained and forces preset (owing for example to lack of alignment between the longitudinal axis A and the electrode and/or to electromagnetic effects generated by the welding) are automatically compensated and corrected by the electronic unit in the next cycle.

The disclosure thus conceived is susceptible of numerous modifications and variations, all of which are within the scope of the appended claims. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The invention claimed is:

1. A welding apparatus, comprising a movement assembly for at least one electrode, configured to be passed through by current for the execution of welding treatments, said assembly comprising at least one cylinder and at least one stem which rigidly supports said electrode, said stem being accommodated at least partially in said cylinder and being coaxially movable with an alternating straight motion along a longitudinal axis of said cylinder, in order to press said at least one electrode against parts to be welded with a corresponding welding force, and further comprising a device for measuring a welding force, which comprises a plate, which is stably interposed between said stem and said at least one electrode with respective faces arranged at right angles to said longitudinal axis, and a plurality of deformation sensors, which are accommodated in through slots provided in said plate and distributed along an imaginary circumference which is centered along said longitudinal axis.

2. The welding apparatus according to claim 1, wherein said plate has a number of said through slots equal to four or eight, said through slots having mutually identical dimensions and being regularly distributed along said imaginary circumference.

3. The welding apparatus according to claim 1, wherein each one of said sensors is an electric resistance strain gauge, which comprises a deformable element which is rigidly applied to a laminar support, which in turn is rigidly applied to one of two end walls of the respective said through slot, which are mutually opposite along said imaginary circumference.

4. The welding apparatus according to claim 3, wherein each one of said through slots accommodates a pair of said strain gauges, which are applied to said end walls.

5. The welding apparatus according to claim 1, wherein each face of said respective faces of the plate has, between each pair of adjacent through slots of said through slots, an accommodation groove for electrical connections of said sensors, which is arranged along said imaginary circumference.

6. The welding apparatus according to claim 5, wherein said slots and said grooves are closed by respective annular protective plugs, which are applied on the corresponding said faces of said plate and are arranged along said imaginary circumference.

7. The welding apparatus according to claim 1, further comprising an electronic control and management unit configured for actuation of said movement assembly and adjustment of the intensity of said welding force, said electronic control and management unit comprising instructions for adjusting intensity of said welding force on the basis of data collected by said deformation sensors, which are controlled by said electronic control and management unit.

8. The welding apparatus according to claim 1, wherein said device comprises a connecting cable for connecting said deformation sensors to a signal converter, for the transfer of the data collected by said sensors to said electronic control and management unit, said connecting cable being at least partially accommodated in a track provided along one side of said plate and arranged, directly or indirectly, in communication with said through slots.

9. The welding apparatus according to claim 1, wherein said plate has a lateral pocket, which is arranged directly or indirectly in communication with said through slots and accommodates electronic components associated with said deformation sensors and external electrical connection terminals of said deformation sensors.

10. The welding apparatus according to claim 1, wherein a first face of said respective faces of said plate is anchored stably to a free end of said stem, a second face of said respective faces of said plate, which is opposite said first face, being anchored stably to a supporting block of said at least one electrode.

* * * * *